United States Patent Office 3,108,970
Patented Oct. 29, 1963

3,108,970
COLLOIDAL SILICA COMPOSITIONS
George W. Luvisi, Brookfield, Ill., assignor to Nalco Chemical Company, a corporation of Delaware
No Drawing. Filed Apr. 8, 1957, Ser. No. 651,132
5 Claims. (Cl. 252—309)

This invention relates to new and useful colloidal silica compositions and to a method for the preparation thereof. The invention is especially concerned with stabilized colloidal silica sols adapted to be applied as a coating to improve the frictional contact between two metal surfaces capable of motion one with respect to the other.

The present application is a continuation-in-part of my copending application Serial No. 533,190, filed September 8, 1955, that has now matured into U.S. Patent 2,787,968, which in turn is a continuation-in-part of my copending application Serial No. 484,171 filed January 26, 1955, later abandoned.

An aqueous colloidal silica sol, that is to say, a sol of colloidal silica in water, can be prepared as described in Bird, U.S. 2,244,325. Commercial silica sols are available containing 18% $SiO_2$ and 30% $SiO_2$. These sols are usually stabilized by the addition of an alkali metal. Thus, a silica sol containing 30% $SiO_2$ in water and having a pH of 10 will remain stable for a long period of time in a closed container. At 95° C. sealed in glass such a sol has been kept for a year. Thawing, subsequent to a freeze, usually will break the colloidal solution and precipitate the silica.

Where a sol containing colloidal silica is to be used at temperatures where water would ordinarily freeze, it is desirable to prepare a colloidal silica composition which is not subject to freezing. This is particularly true where the composition is to be employed for improving the frictional contact between railway locomotive wheels and rails. Such silica sols, however, are very sensitive to the addition of some of the more common antifreeze materials such as monohydric alcohols. For example, in my copending application Serial No. 505,373, which has matured into U.S. Patent 2,787,965, I have described the preparation of hydrophilic gelatinous silica paste by adding a monohydric alcohol to a silica sol. In this instance the addition of the monohydric alcohol produces a gelatinous precipitate of the colloidal silica. In general, the more concentrated the sol the less will be the amount of alcohol required to produce this precipitate.

Another factor of importance in the use of hydrophilic sols containing colloidal silica where such sols are applied to metals, such as steel, is the tendency to corrode the metal.

With the foregoing disadvantages in mind, one of the objects of the present invention is to produce a hydrophilic colloidal silica sol which remains stable at temperatures below the freezing point of water.

Another object is to produce new and improved hydrophilic silica sols which will retain their liquid state when stored over a substantial period of time and can be applied as a liquid coating after such storage.

Still a further object of the invention is to provide new and useful silica sols which are less corrosive to metals, such as iron and steel, than ordinary rain water.

An additional object of the invention is to provide a new and improved process for producing compositions of the type described. Other objects will appear hereinafter.

In accordance with the invention new and useful sols of colloidal silica are provided containing silica in a colloidal state, a monohydric alcohol which is normally liquid at 0° F. and a minor proportion of phosphoric acid sufficient to produce a pH within the range of 3 to 4.5, preferably from 3.5 to 4.2. Examples of the preferred alcohols for the purpose of the invention are methanol, ethanol and isopropanol. The concentration of $SiO_2$ in the resultant composition can be as low as 1.5% by weight and may be as high as 48% by weight. It is preferably within the range of 9% by weight to 35% by weight $SiO_2$. The concentration of monohydric alcohol should be such that the freezing point of the composition is below 32° F. and preferably below 0° F. The weight percent of the monohydric alcohol is preferably within the range of 30% to 70%.

In the preparation of the composition of the invention where an aqueous colloidal silica sol is used initially, the phosphoric acid should be added first to the aqueous colloidal silica sol, followed by the addition of the monohydric alcohol to the acid adjusted sol. Otherwise, depending upon the nature of the alcohol, the nature of the silica sol, and the concentration of the components, the addition of the aqueous colloidal silica sol or the monohydric alcohol to one another may form a gelatinous precipitate. The mixing of the components may be carried out at ordinary temperatures within the range of 60° F. to 100° F.

The average particle size of the colloidal silica present in the compositions provided in accordance with the invention is subject to variation but the average particle size will normally vary from 1 to 150 millimicrons.

The invention will be further illustrated but is not limited by the following examples in which the quantities are stated in parts by weight unless otherwise indicated.

*Example I*

A composition was prepared by adding orthophosphoric acid to a silica sol prepared by the ion exchange method containing 35% $SiO_2$ in water, the concentration of phosphoric acid being sufficient to produce a pH of 3.5, and then adding isopropanol until the isopropanol content was 50% by volume of the total volume.

This composition was tested in actual railroad operation by applying it as a coating to the rails and was found to provide improved adherence whereby heavier trains could be pulled without slipping of the locomotive wheels.

*Example II*

A composition was prepared by adding 85% orthophosphoric acid to an aqueous silica sol containing 30% $SiO_2$ in sufficient amount to produce a pH of 3.5, and then adding isopropanol so that the resultant composition contained in the following ingredients.

| Ingredients | Percent by weight |
|---|---|
| Isopropanol | 39.4 |
| 85% phosphoric acid | 0.3 |
| 30% $SiO_2$ sol | 60.3 |

This composition had a specific gravity of 1.032 at 60° F. and was stable against freezing to temperatures of 5° below 0° F.

Corrosion tests on steel were made and it was found that this composition was about 80% less corrosive than rain water.

Excellent results were obtained in the use of this composition for improving the frictional contact between railroad locomotive wheels and rails.

*Example III*

A composition was prepared by adding orthophosphoric acid in sufficient amount to produce a pH of 3.7 to a silica sol containing 30% $SiO_2$ and the remainder water except for a small amount of alkali metal hydroxide previously added to the sol to stabilize it. Isopropanol was then added to the phosphoric acid containing sol to produce a composition containing the following ingredients.

| Ingredients | Percent by weight |
|---|---|
| Isopropanol | 66.4 |
| 85% H$_3$PO$_4$ | 0.4 |
| 30% SiO$_2$ sol | 33.2 |

The specific gravity of this composition was .916 at 60° F.

*Example IV*

A composition was prepared by adding 10% by weight of Dow Corning fine silica to water to form a 10% sol, then adding sufficient orthophosphric acid to produce a pH of about 3.7 and finally adding an equal volume of isopropanol. The fine silica used was a powdery material having a surface area of 150 to 200 square meters per gram and when dispersed in the liquid the colloidal silica particles have an average diameter of 10 to 20 millimicrons.

This composition is also useful to improve frictional contact between metal surfaces which are capable of movement one with respect to the other and is likewise less corrosive than ordinary rain water.

The silica sols used as starting materials in Examples I, II and III are commercially available silica sols and initially contain a small amount of an alkali metal added to impart stability to the sol. The ratio of SiO$_2$ to Na$_2$O in such sols is normally within the range of 50:1 to 100:1. So far as the present invention is concerned, however, the presence of the alkali metal is not believed to have any effect, it being understood that a freshly prepared sol containing no added stabilizing agent can be employed for the purpose of the invention. In Example IV, of course, since a fine silica is used initially, no alkali metal is present.

Where an aqueous sol is used for the preparation of the hydrophilic liquid composition containing silica in a colloidal state, it is usually preferable to employ as a starting material an aqueous silica sol containing 3.0% to 48% by weight SiO$_2$ in water. It will be understood that the alcohol used can be a commercially available alcohol containing minor proportions of water and in the case of some alcohols, such as ethanol, likewise containing denaturants. The isopropanol referred to in the examples is a commercially available isopropanol usually not containing more than 1% water.

Instead of the fine silica described in Example IV any number of fine silicas may be substituted which have the property of forming colloidal silica sols with hydrophilic liquids. Another example of such fine silica is Cab-o-sil having a surface area of 175-200 m.$^2$/g. and a particle size of 0.015 to 0.020 micron, derived from silicon tetrachloride. In general, these fine silicas will have a specific surface area of at least 25 square meters per gram and the specific surface area will not usually exceed 1000 square meters per gram, a preferred range of specific surface areas being from 25 square meters per gram to 400 square meters per gram.

While the invention has been described with reference to the use of orthophosphoric acid, other acids of phosphorus can be used, including pyrophosphoric acid, and phosphorous acids.

Although the compositions of the invention are especially useful for improving the frictional contact between wheels and rails, they are useful also for other purposes in improving frictional contact between two metal surfaces capable of motion one with respect to the other.

The invention is hereby claimed as follows:

1. A liquid hydrophilic composition containing silica in a colloidal state, said composition consisting essentially of 30% to 90% by weight of a monohydric alcohol which is normally liquid at 0° F., 9% to 35% by weight of SiO$_2$ in a colloidal state and a minor proportion of an inorganic acid of phosphorus sufficient to produce a pH within the range of 3 to 4.5.

2. A liquid hydrophilic composition containing silica in a colloidal state, said composition consisting essentially of 30% to 70% by weight of a monohydric alcohol which is normally liquid at 0° F., 9% to 35% by weight of SiO$_2$ in a colloidal state and a minor proportion of orthophosphoric acid sufficient to produce a pH within the range of 3 to 4.5.

3. A liquid hydrophilic composition containing silica in a colloidal state, said composition consisting essentially of 30% to 70% by weight of a monohydric alcohol which is normally liquid at 0° F., 9% to 35% by weight of SiO$_2$ in a colloidal state and a minor proportion of orthophosphoric acid sufficient to produce a pH within the range of 3.5 to 4.2.

4. A liquid hydrophilic composition containing silica in a colloidal state, said composition consisting essentially of 30% to 90% by weight isopropanol, 9% to 35% by weight SiO$_2$ in a colloidal state and a minor proportion of orthophosphoric acid sufficient to produce a pH within the range of 3 to 4.5.

5. A liquid hydrophilic composition containing silica in a colloidal state, said composition consisting essentially of 30% to 90% by weight isopropanol, 9% to 35% by weight SiO$_2$ in a colloidal state and a minor proportion of orthophosphoric acid sufficient to produce a pH within the range of 3.5 to 4.2.

References Cited in the file of this patent

UNITED STATES PATENTS

| 2,285,449 | Marshall | June 9, 1942 |

FOREIGN PATENTS

| 654,850 | Great Britain | July 4, 1951 |